Patented Jan. 13, 1925.

1,522,733

UNITED STATES PATENT OFFICE.

BENJAMIN LAPADULA, OF PIXLEY, CALIFORNIA.

SCRAPER ATTACHMENT FOR TRACTORS.

Application filed March 17, 1923. Serial No. 625,839.

*To all whom it may concern:*

Be it known that I, BENJAMIN LAPADULA, a citizen of the Kingdom of Italy, and resident of Pixley, in the county of Tulare, State of California, have invented certain new and useful Improvements in Scraper Attachments for Tractors, of which the following is a specification.

My invention relates primarily to an attachment for a scraper known as the Fresno scraper, and the object thereof is to provide suitable connections and operative elements between a scraper and a tractor whereby the same may be used in levelling land, and whereby the rotation of the driving wheels of the tractor may be utilized to unload or dump the scraper at the will of the operator.

A further object is to provide cheap, simple and efficient means for the above purpose.

A further object is to provide means for automatically stopping the dumping operation at a predetermined time.

Other objects and advantages will appear hereinafter and, while I have shown and will describe the preferred form of my invention, I wish it understood that I do not limit myself to such preferred form but that various changes and adaptations may be made therein without departing from the spirit of my invention.

In the drawings accompanying and forming a part hereof:

Figure 1:
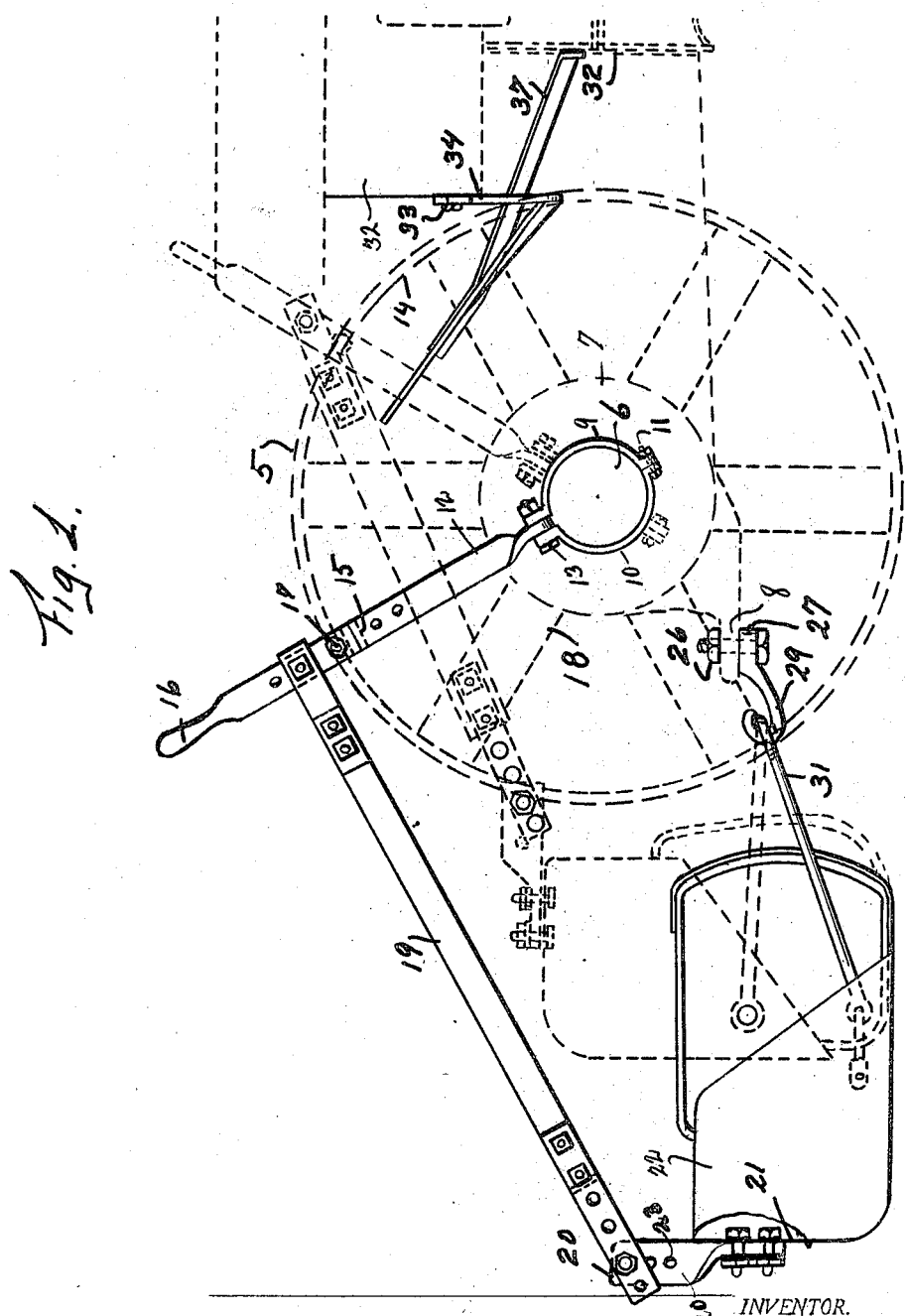
Fig. 1 is a side elevation of my device positioned for use, with sufficient of a tractor, of the Fordson type, to illustrate my device shown in dotted lines.
Figure 2:
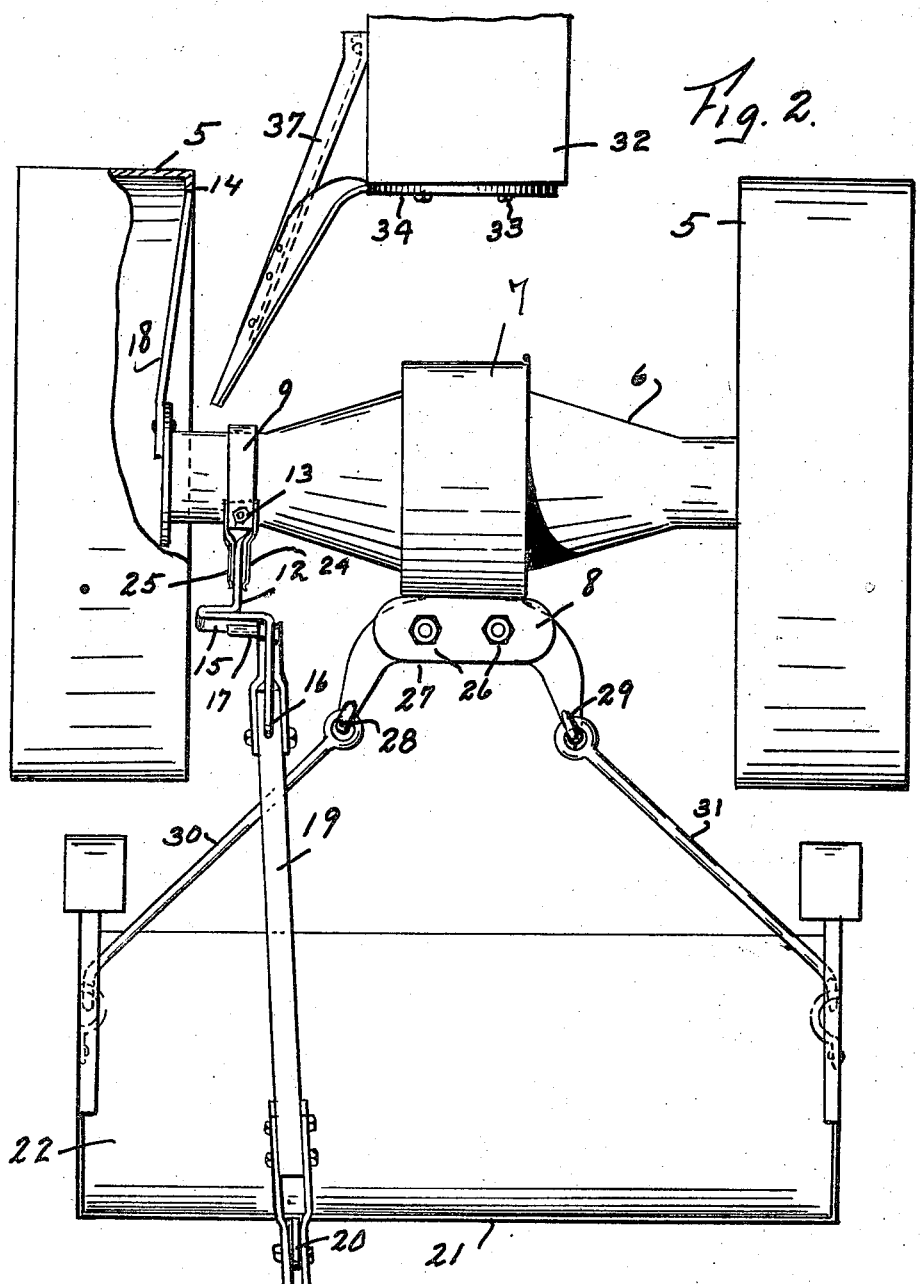
Fig. 2 is a top plan of Fig. 1.
Figure 3:
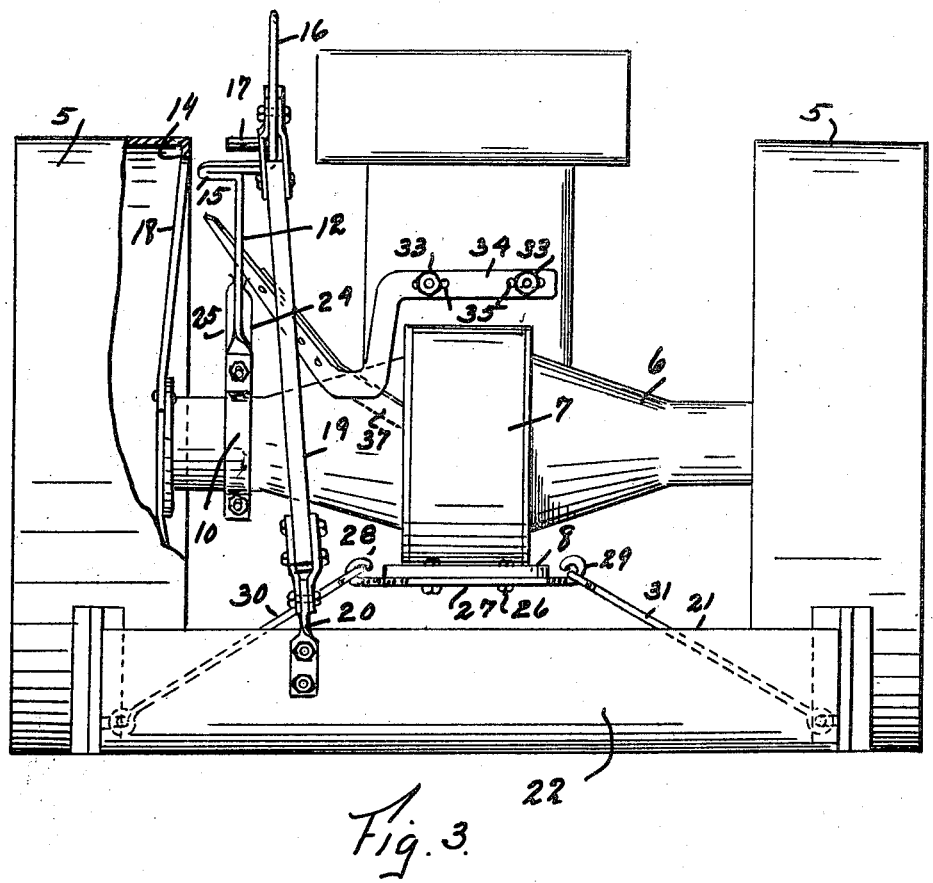
Fig. 3 is a rear end elevation of a tractor equipped with my device.

In the drawings 5 indicates the rear wheels of the tractor, 6 the rear axle housing, 7 the transmission case, and 8 the draw bar. Mounted upon the rear axle, at one side thereof, is a split ring formed of two halves 9 and 10 secured together at one end by bolts 11 and having their other ends spaced apart a short distance, and in this spaced apart portion is pivotally mounted one end of the operating lever 12 by bolts 13, the assembled split ring forming a rocking bearing for the lever. Lever 12 extends upwardly and rearwardly to a point just below the edge of the rim 14 of wheel 5 where it is bent or doubled upon itself to form an outwardly projecting lug 15, and then extends upwardly and terminates in a handle 16. Immediately above lug 15 lever 12 is provided with an outstanding stud 17 the purpose of which is to prevent lug 15 from being passed too far between the spokes 18 of wheels 5. Pivotally connected at one end to lever 12, immediately above stud 17, is a pull bar 19 which extends downwardly and rearwardly and has its other end pivotally connected to a bracket 20 mounted upon the outer side of the rear wall 21 of the scraper 22. Member 20 is provided with a plurality of holes 23, the purpose of which will be obvious. Extending upwardly from each side of members 9 and 10 are flat springs 24 and 25 which bear against the sides of lever 12 and act to hold the same in its normal inoperative position as hereafter explained. Secured to the under side of the draw bar 8 of the tractor, by means of bolts 26, is a bracket 27 the free ends of which terminate in upturned hooks 28 and 29, and loosely mounted upon these hooks 28 and 29 are the free ends of the pull rods 30 and 31 of the scraper 22, the other ends of rods 30 and 31 being connected to the scraper in the usual well known manner. Mounted upon the rear wall of the engine casing 32 of the tractor, by means of bolts 33, is a disengaging member 34 provided with slots 35, through which said bolts pass, to permit adjustment of said member 34. One end of said bracket terminates near the side of engine casing 32. The other end is bent to extend downwardly a short distance and then outwardly and is then twisted to extend forwardly and upwardly at an angle and terminates near the inner side of wheel 5. A brace member 37, secured at one end to the free end of member 34 and extending rearwardly, is secured to the crank case in any suitable position.

In the operation of my device the parts will normally lie in the positions shown in full lines in the drawings. When it is desired to dump the scraper, handle 16 will be used to press lever 12 outwardly until lug 15 passes beneath the rim 14 of the wheel 5. Upon the rotation of wheel 5 one of the spokes 18 will engage lug 15 and carry the same forwardly in an arc together with lever 12. As the scraper 22 approaches its dumping position lever 12 will engage the inner edge of the free end of member 34 and will be guided by the same outwardly away from wheel 5, thereby releasing lug 15 from engagement with the spoke 18, member 34 being so positioned and arranged that lever 12 will be entirely disengaged from spoke 18 and away from wheel 5 by the time said scraper is in its maximum dumping position. The operator will then grasp handle 16 and move lever 12 rearwardly to its normal original position, when the device is again ready for use. Stud 17 is provided to prevent lug 15 being projected too far into the interior of wheel 5, thereby insuring operative engagement of said lever with member 34. Holes 23 are provided for use in levelling, as will be obvious.

Having described my invention, what I claim is:

1. A scraper attachment for tractors comprising a scraper; a flexible connection from said scraper to the draw bar of a tractor; an operating lever for said scraper pivotally mounted on the rear axle of said tractor; a connection from the upper end of said lever to the rear wall of said scraper adapted, when said lever is operated, to dump said scraper; a projection extending outwardly from one side of said lever adapted to be engaged by said wheel to operate said lever; and a releasing member mounted on said tractor adapted to disengage said lever from said wheel at a predetermined time.

2. A tractor attachment comprising a scraper; a connection from said scraper to the draw bar of said tractor; a lever rotatably mounted at one end on the axle housing of said tractor to extend radially; a connection from the upper end of said lever to said scraper, whereby forward movement of said lever will dump said scraper; means mounted on said lever adapted for engagement with the tractor wheel, whereby said lever is operated; and means mounted on said tractor adapted to release said last means at a predetermined time.

3. A scraper attachment for tractors comprising a scraper adapted for connection to the draw bar of a tractor; an operating lever rockably mounted upon said tractor adapted to be brought into engagement with a wheel of said tractor and to be rocked forwardly thereby; a connection between said lever and said scraper whereby forward movement of said lever will move said scraper to its dumping position; and means engaged by said lever during its forward movement to disengage the same from said wheel.

4. A tractor attachment comprising a scraper; a connection from said scraper to the draw bar of said tractor; means mounted upon the axle housing of said tractor adapted to be engaged and operated by forward movement of a wheel of said tractor to dump said scraper; a connection between said last means and said scraper; and means carried by said tractor adapted to release said dumping means at a predetermined time.

5. A tractor attachment comprising a scraper; a connection from said scraper to the draw bar of a tractor; a lever rockably mounted upon said tractor adapted to be brought into engagement with a rotating element carried by said tractor to rock said lever forwardly in an arc; a connection from said lever to said scraper adapted when said lever is moved forwardly to move said scraper to its dumping position.

6. The attachment set forth comprising a lever movable into driving engagement with a power driven rotary element that is adapted to actuate said lever to move a body to a predetermined position; and means for automatically disengaging said lever from said rotary element after the body has been moved to the predetermined position.

7. The attachment set forth comprising a rocking bearing; a power driven rotary element adjacent said bearing; a lever having one end pivotally connected to said rocking bearing, said lever being adapted to be manually actuated side-wise to said bearing to move said lever into driving engagement with said rotary element; a body connected with said lever that is adapted to move therewith when said lever is actuated by said rotary element; and means for disengaging said lever from said rotary element after it has been moved a predetermined distance.

8. The attachment set forth comprising a rocking bearing ring; an axle housing on which said ring is loosely mounted; a power driven rotary element adjacent said ring; a lever having one end pivotally connected to said ring, said lever being adapted to be actuated side-wise to said ring to move it into driving engagement with said rotary element; a body; a connection from said lever to said body, said connection being adapted to move said body when said lever is actuated by said rotary element; and means for disengaging said lever from said rotary element after said body has been moved a predetermined distance.

9. The attachment set forth comprising a split ring that is mounted and adapted to rock on a pivot; a power-driven wheel adjacent said split ring, said wheel having spokes; a lever having one end pivotally connected to said split ring; a projection on said lever, said lever adapted to be actuated side-wise to said split ring to move said projection into driving engagement with a spoke of said wheel; a body; a pull bar connecting said lever with said body, said pull bar adapted to move said body when said projection is engaging a spoke and is actuated by said wheel; and an automatic means for disengaging said projection from a spoke of said wheel when said body has been moved a predetermined distance.

10. The attachment set forth comprising a pivotally mounted ring; a lever having one end pivotally connected to said ring, said lever bent to form a projection and said lever being adapted to be actuated side-wise to said split ring; a drive wheel adapted to engage the projection on said lever when it is moved side-wise to said ring and toward said wheel; means for limiting the movement of said lever toward said wheel; a body; a pull bar connecting said lever and body, said bar being adapted to move said body into a predetermined position when said wheel is actuated and the projection on said lever is in driving engagement with said wheel; and a disengaging member for moving said lever and projection thereon away from said wheel after said body has been moved into a predetermined position.

In witness that I claim the foregoing I have hereunto set my hand this 2nd day of March, 1923.

BENJAMIN LAPADULA.